(12) United States Patent
Trinder, II et al.

(10) Patent No.: US 11,252,958 B2
(45) Date of Patent: Feb. 22, 2022

(54) ANTIMICROBIAL SOLID SURFACES AND TREATMENTS AND PROCESSES FOR PREPARING THE SAME

(71) Applicant: Cupron, Inc., Richmond, VA (US)

(72) Inventors: Kenneth Gauthier Trinder, II, Norfolk, VA (US); Vikram Kanmukhla, Henrico, VA (US)

(73) Assignee: Cupron, Inc., Richmond, VA (US)

( * ) Notice: Subject to any disclaimer, the term of this patent is extended or adjusted under 35 U.S.C. 154(b) by 0 days.

(21) Appl. No.: 16/456,133

(22) Filed: Jun. 28, 2019

(65) Prior Publication Data

US 2020/0154701 A1   May 21, 2020

Related U.S. Application Data

(63) Continuation of application No. 14/420,518, filed as application No. PCT/US2013/054040 on Aug. 8, 2013.

(60) Provisional application No. 61/681,158, filed on Aug. 9, 2012.

(51) Int. Cl.
 *A01N 25/10* (2006.01)
 *A01N 59/20* (2006.01)

(52) U.S. Cl.
 CPC ............. *A01N 25/10* (2013.01); *A01N 59/20* (2013.01)

(58) Field of Classification Search
 CPC ................................ A01N 25/10; A01N 59/20
 See application file for complete search history.

(56) References Cited

U.S. PATENT DOCUMENTS

| | | | |
|---|---|---|---|
| 5,260,006 A | 11/1993 | Scher et al. | |
| 5,997,829 A | 12/1999 | Sekine et al. | |
| 6,517,897 B1 * | 2/2003 | Bordener | B29C 37/0032 427/133 |
| 6,663,877 B1 | 12/2003 | Appleton et al. | |
| 9,259,083 B1 | 2/2016 | Fritz et al. | |
| 2004/0247653 A1 | 12/2004 | Gabbay | |
| 2005/0048131 A1 | 3/2005 | Gabbay | |
| 2005/0049370 A1 | 3/2005 | Gabbay | |
| 2006/0125137 A1 | 6/2006 | Trinder et al. | |
| 2008/0193496 A1 | 8/2008 | Gabbay | |
| 2011/0200755 A1 | 8/2011 | Mezzo et al. | |
| 2012/0171276 A1 | 7/2012 | Fujimori et al. | |
| 2012/0288678 A1 | 11/2012 | Grube et al. | |
| 2013/0195841 A1 | 8/2013 | Gabbay | |

FOREIGN PATENT DOCUMENTS

| | | |
|---|---|---|
| CN | 101184397 A | 5/2008 |
| EP | 1779727 A1 | 5/2007 |
| JP | S52110076 A | 9/1977 |
| JP | S62-501852 A | 7/1987 |
| JP | H01-272420 A | 10/1989 |
| JP | H0466512 A | 3/1992 |
| JP | H06264520 A | 9/1994 |
| JP | H0912415 A | 1/1997 |
| JP | H10208906 A | 8/1998 |
| JP | 2002-506465 A | 2/2002 |
| JP | 2003-335864 A | 11/2003 |
| JP | 2006-016518 A | 1/2006 |
| JP | 2006-052205 A | 2/2006 |
| JP | 2008-534708 A | 8/2008 |
| KR | 10-2007-0121690 A | 12/2007 |
| WO | 1986004908 A1 | 8/1986 |
| WO | 1994015463 A1 | 7/1994 |
| WO | 1997049761 A1 | 12/1997 |
| WO | 2006100665 A2 | 9/2006 |
| WO | 2011089591 A1 | 7/2011 |
| WO | 2014025949 A2 | 2/2014 |
| WO | 2014130431 A2 | 8/2014 |

OTHER PUBLICATIONS

English Translation of Text Portion of the Notification of the Second Office Action received for Chinese Patent Application No. 201380045637.6, dated Jun. 21, 2017, 5 pages.

S. Rodriguez-Llamazares et al., "Pvc/Copper oxide composites and their effect on bacterial adherence", J. Chil. Chem. Soc., 57, N°2, Bacterial adhesion, e-mail: mmondaca@udec.cl, 1165, Published in 2012, 3 pages.

English Translation of Office Action received for Japanese Patent Application No. 526685/2015, dated May 16, 2017, 7 pages.

Zhanhu Guo et al., "CuO nanoparticle filled vinyl-ester resin nanocomposites: Fabrication, characterization and property analysis", Composites Science and Technology, vol. 67, Issue 10, Aug. 2007, pp. 2036-2044, ScienceDirect, 2 pages, retrieved on Feb. 25, 2020.

Extended European Search Report received for EP application No. 13827838. 7 dated Mar. 15, 2016, 22 pages.

Jay K. Kochi, "The Decomposition of Peroxides Catalyzed by Copper Compounds and the Oxidation of Alkyl Radicals by Cupric Salts", vol. 85, 1958, copper-catalyzed decomposition of peroxides, 11 pages, retrieved on Feb. 25, 2020.

Khalida Akhtar, "Decomposition of Hydrogen Peroxide by Nickel Oxide Powders", Kohat University of Science and Technology, Kohat, N. W. F. P., Pakistan, J. Chem. Soc. Pak., vol. 31, No. 1, 2009, 5 pages, retrieved on Feb. 25. 2020.

Zhanhu Guo et al., "CuO nanoparticle filled vinyl-ester resin nanocomposites: Fabrication, characterization and property analysis", Composites Science and Technology 67 (2007) 2036-2044, ScienceDirect, Composites science and Technology, Elsevier, 10 pages, retrieved on Feb. 25, 2020.

Cupron Inc. (Cupron) and EOS Surfaces, LLC. (EOS), "Declaration of ED locke", U.S. Appl. No. 14/420,518, antimicrobial solid surfaces and treatments and processes for preparing the same, 4 pages, retrieved on Feb. 25, 2020.

* cited by examiner

*Primary Examiner* — Robert S Cabral

(74) *Attorney, Agent, or Firm* — Bernard G. Pike; Pike IP Law

(57) ABSTRACT

Provided is an antimicrobial non-isotactic polymer based hard or semi-flexible surface in a thermoset and/or thermoplastic resin matrix wherein the active antimicrobial ingredient is copper oxide. Processes for preparing the same and applications thereof are also described.

11 Claims, 6 Drawing Sheets

Cuprous oxide impregnated polymeric resin
(Polyester)

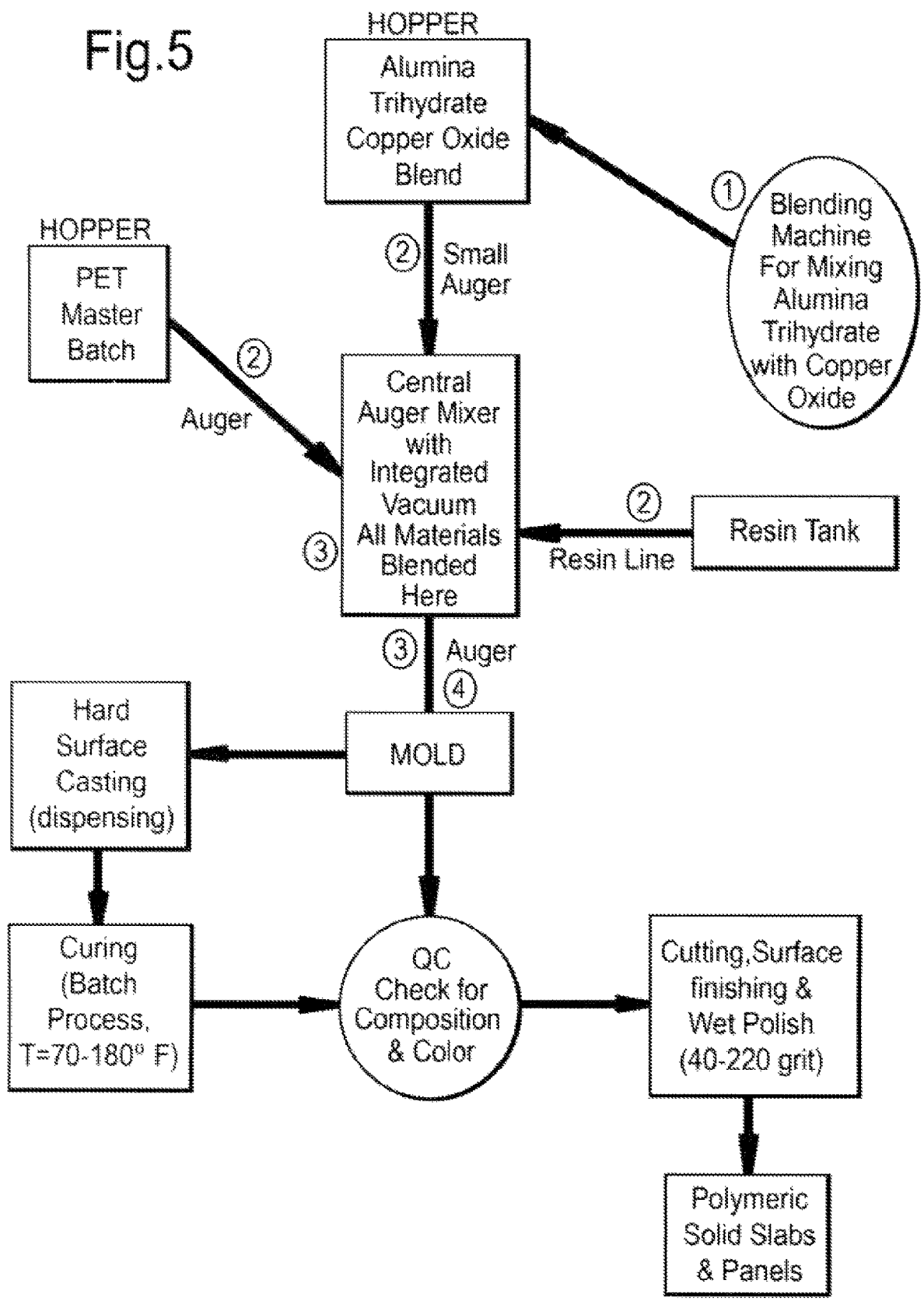

ANTIMICROBIAL SOLID SURFACES AND TREATMENTS AND PROCESSES FOR PREPARING THE SAME

CROSS-REFERENCE TO RELATED APPLICATION

This application is continuation of application Ser. No. 14/420,518 filed on Feb. 9, 2015, which is a National Stage Application of PCT/US2013/054040 filed on Aug. 8, 2013 which in turns claims benefit from Provisional Application No. 61/681,158 filed on Aug. 9, 2012. The above-identified patent applications are hereby incorporated by reference in their entirety.

FIELD OF INVENTION

The invention is directed to polymeric solid panels and slab possessing and polymer resin treatments imparting antibacterial, antifungal, antiviral and sporicidal properties.

BACKGROUND OF THE INVENTION

Microbes (bacteria, fungi, viruses and spores) are a part of our everyday life and are located on almost all hard surfaces. Since bacteria, fungi, viruses and spores can persist on most hard surfaces, especially if there is even a small amount of moisture, for varying periods of time, such surfaces become a reservoir of infection, and transmission to a host in contact with the surface can occur. Unless a surface is specifically treated with an antimicrobial agent, bacteria, fungi, and viruses, especially if the surface is moist, have the possibility of establishing a presence on the hard surface. Such surfaces provide an entree into the host by the pathogenic microorganisms, which can negatively impact morbidity and mortality.

One means for eradicating or diminishing contact exposure to microbes present on solid surfaces is to incorporate an antimicrobial compound within or on the solid surface. Copper ion releasing compounds, such as copper oxide are known to be highly effective microcidal agents, having been demonstrated to be highly effective against bacteria, fungi, and viruses [Gabbay, et al. (2002) The FASEB Journal express article 10.1096/jf.04-2029fje. Published online Sep. 2, 2004].

In most cases, the amount of metal oxides that can be incorporated in a polymer is limited (US 2004/0247653) because of the interfering nature of metal oxides in disruption of cross linkage and chemical binding mechanisms, necessary for the creation of the solid surface polymeric panels and slab material. Since antimicrobial activity is proportionately related to the copper oxide loading, this limitation has impacted the practical development of copper oxide containing antimicrobial hard surface materials.

Counter tops made from copper and its alloys are effective in controlling the microbial burden on a hard surface of counter top as evidenced in "Sustained Reduction of Microbial Burden on Common Hospital Surfaces through Introduction of Copper" [Michael G Schmidt, Hubert H Attaway, Peter A Sharpe, Joseph John Jr, Kent A Sepkowitz, Andrew Morgan, Sarah E Fairey, Susan Singh, Lisa L Steed, J Robert Cantey, Katherine D Freeman, Harold T Michels and Cassandra D Salgado. J Clin-Microbiol July 2012 vol. 50 no. 7, 2217-2223. Published ahead of print 2 May 2012, doi: 10.1128/JCM.01032-12].

However, copper and its alloys are expensive and the practicality of their incorporation is both technically challenging and expensive. In addition, in many cases a metal hard surface can often be unattractive due to oxidation staining as well as difficult to maintain esthetically.

The effect of ionic kill mechanisms is well documented. Copper oxide has been demonstrated to be an effective antimicrobial agent [Current Medicinal Chemistry, 2005, 12, 2163-2175 2163 0929-8673/05 2005 Bentham Science Publishers Ltd. "Copper as a Biocidal Tool" Gadi Borkow* and Jeffrey Gabbay].

While it was previously known that the incorporation of copper within composite structural solid materials imparts antimicrobial activity to the same, and in particular, while it was known that copper oxide is an effective antimicrobial agent, composite structural solid materials to date were limited in that loading of more than 10% w/w of copper-containing particles within such materials was not attainable.

SUMMARY OF THE INVENTION

This invention provides high copper oxide loaded composite structural solid materials which are biocidal.

The present invention, in some embodiments, provides for high copper compound loadings as well as a system for their incorporation to provide highly effective antimicrobial performance on a synthetically created hard surface, while maintaining an aesthetic appearance to the product and maintaining product strength with workability to manufacture products that benefit from biocidal properties. Since there is a direct relationship between microcidal efficacy and load levels but since high-load levels can affect the product qualities negatively, surprisingly these contradictory findings have been overcome and a product and process are presented, which incorporate high loading levels of copper particles, in a product possessing structural integrity and an appropriately satisfying appearance.

In some embodiments, this invention provides a composite structural solid material comprising a polymeric resin and copper oxide particles substantially uniformly dispersed therein optionally further comprising a filler material, wherein said copper oxide is present at a concentration ranging from 10% to 50% w/w % and wherein a portion of said copper oxide particles are surface exposed.

In some embodiments, this invention provides a finished product comprising a composite structural solid material as herein described.

In some embodiments, this invention provides a finished product comprising a composite structural liquid binding material herein described that can be incorporated into structural laminations, sprayed or painted on to a surface and will harden to provide an antimicrobial surface.

In some embodiments, this invention provides a batch mix process for the manufacture of a composite structural solid material comprising a polymeric resin and copper oxide particles substantially uniformly dispersed therein the process comprising the steps of:
  mixing a polymeric resin, a filler and optionally a pigment;
  mixing a catalyst with a mixture of said polymeric resin, filler and optionally said pigment;
  simultaneously mixing copper oxide or a copper oxide containing composition with said catalyst to said mixture of said polymeric resin, filler and optionally said pigment or stepwise mixing copper oxide or a copper oxide containing composition with said mixture of said polymeric resin, filler and optionally said pigment and said catalyst to form a polymerizable composite structural material;

distributing said polymerizable composite structural material in a mold; and providing conditions for polymerization of said polymerizable composite structural material, thereby preparing a composite structural solid material.

In some embodiments, this invention provides a continuous pour process for the manufacture of a composite structural solid material comprising a polymeric resin and copper oxide particles substantially uniformly dispersed therein the process comprising the steps of:

mixing a polymeric resin or a filler with copper oxide until well blended to form a resin-copper oxide paste or filler-copper oxide blend;

stepwise, subsequently mixing said resin-copper oxide paste or filler-copper oxide blend with a filler or resin, respectively and optionally a pigment to form a copper oxide containing blended composition;

stepwise, subsequently mixing a catalyst with said copper oxide containing blended composition to form a polymerizable composite structural material;

distributing said polymerizable composite structural material in a mold; and providing conditions for polymerization of said polymerizable composite structural material, thereby preparing a composite structural solid material.

In some embodiments, this invention provides a composite structural solid material prepared by a process as herein described.

In some embodiments, the invention provides a method for imparting antimicrobial activity to a composite structural solid material, said method comprising preparing a composite structural solid material containing copper oxide dispersed therein, wherein said copper oxide is present at a concentration ranging from 10 to 50% w/w % and wherein a portion of said copper oxide particles are surface exposed.

BRIEF DESCRIPTION OF THE DRAWINGS

FIG. 2A demonstrates the anti-, microbial activity of an embodied composite structural solid material of this invention against gram positive bacteria; gram negative bacteria and fungus activity. FIG. 2B demonstrates the sporicidal activity of an embodied composite structural solid material of this invention against *C. difficile* spores. FIG. 2C demonstrates the antibacterial activity of another an embodied composite structural solid material of this invention.

FIGS. 4A and 4B show representative images of a top surface of the embodied composite solid material of this invention and FIGS. 4C and 4D show representative images of a bottom surface of an embodied composite solid material of this invention.

FIG. 5 is a block diagram describing an embodied continuous pour process of this invention.

DETAILED DESCRIPTION OF THE INVENTION

Surprisingly, as demonstrated herein, a method whereby a composite structural solid material is produced, which method comprises:

1. Mixing polymeric resin and pigments;
2. Adding catalyst;
3. Adding fillers and a copper oxide-containing, PET master batch;
4. or adding copper oxide powder;
5. or adding both a copper oxide-containing, PET master batch and copper oxide powder; and
5. Casting the resultant mixture into a mold The methods of this invention, which produces a composite structural solid material is characterized in that the material exhibits enhanced copper oxide loading of above 10% wt/wt and even higher, without compromising its structural integrity, for example, hardness or uniformity of texture.

Figure 1:
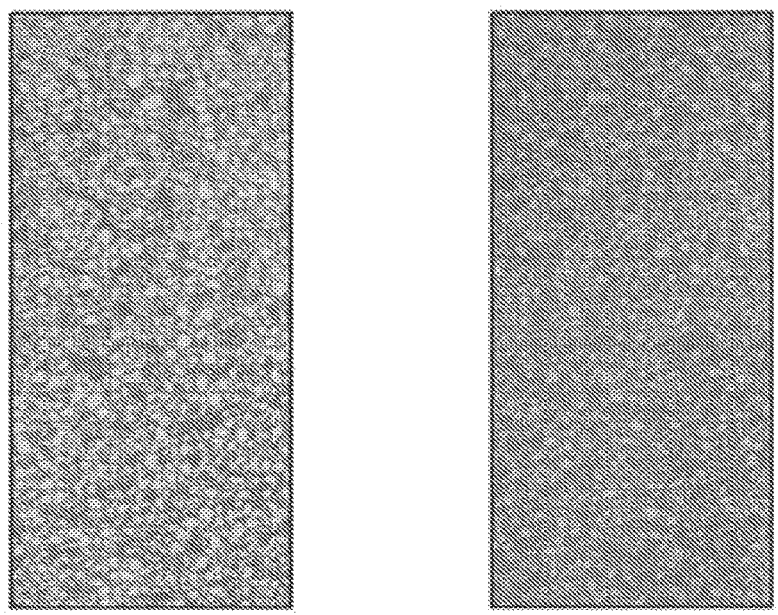
FIG. 1 depicts a photograph of two embodied composite structural solid materials containing copper oxide and a polyester and acrylic resin blend and two different pigments.
Figure 2A:
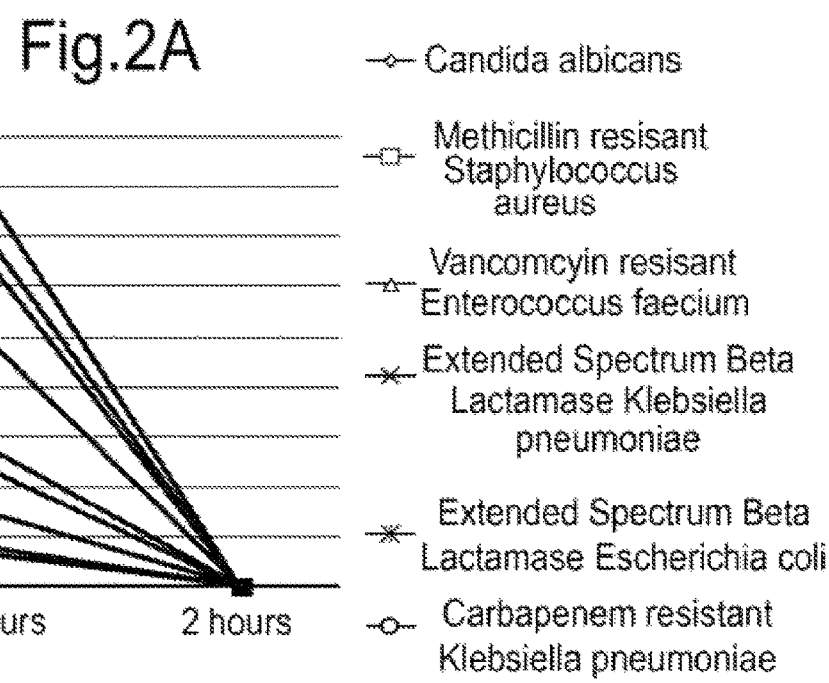
FIGS. 2A-2C depict the biocidal activity of an embodied composite structural solid material of this invention.
Figure 2B:
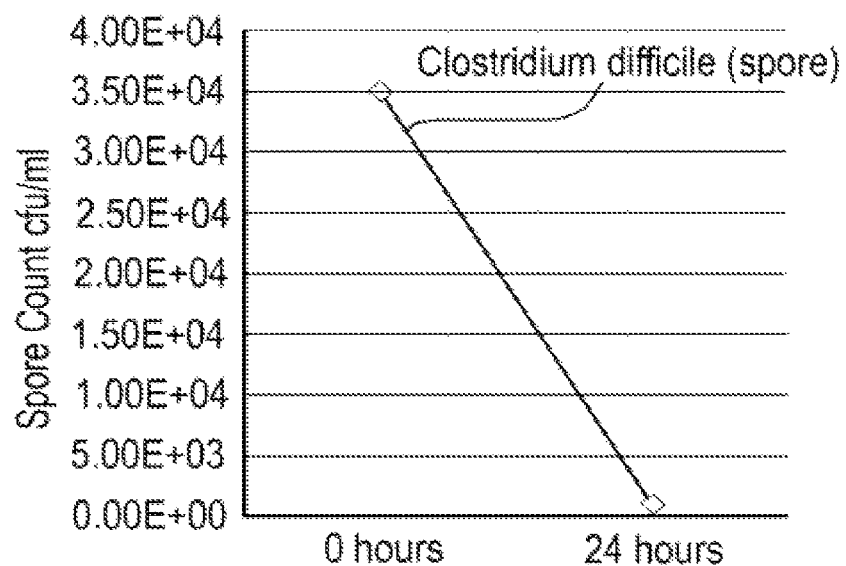
Figure 2C:
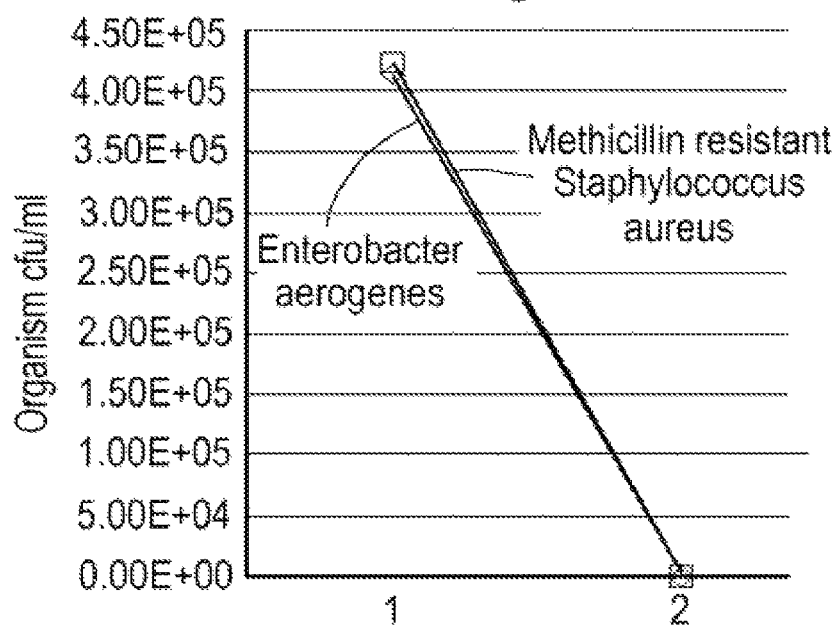
Figure 3:
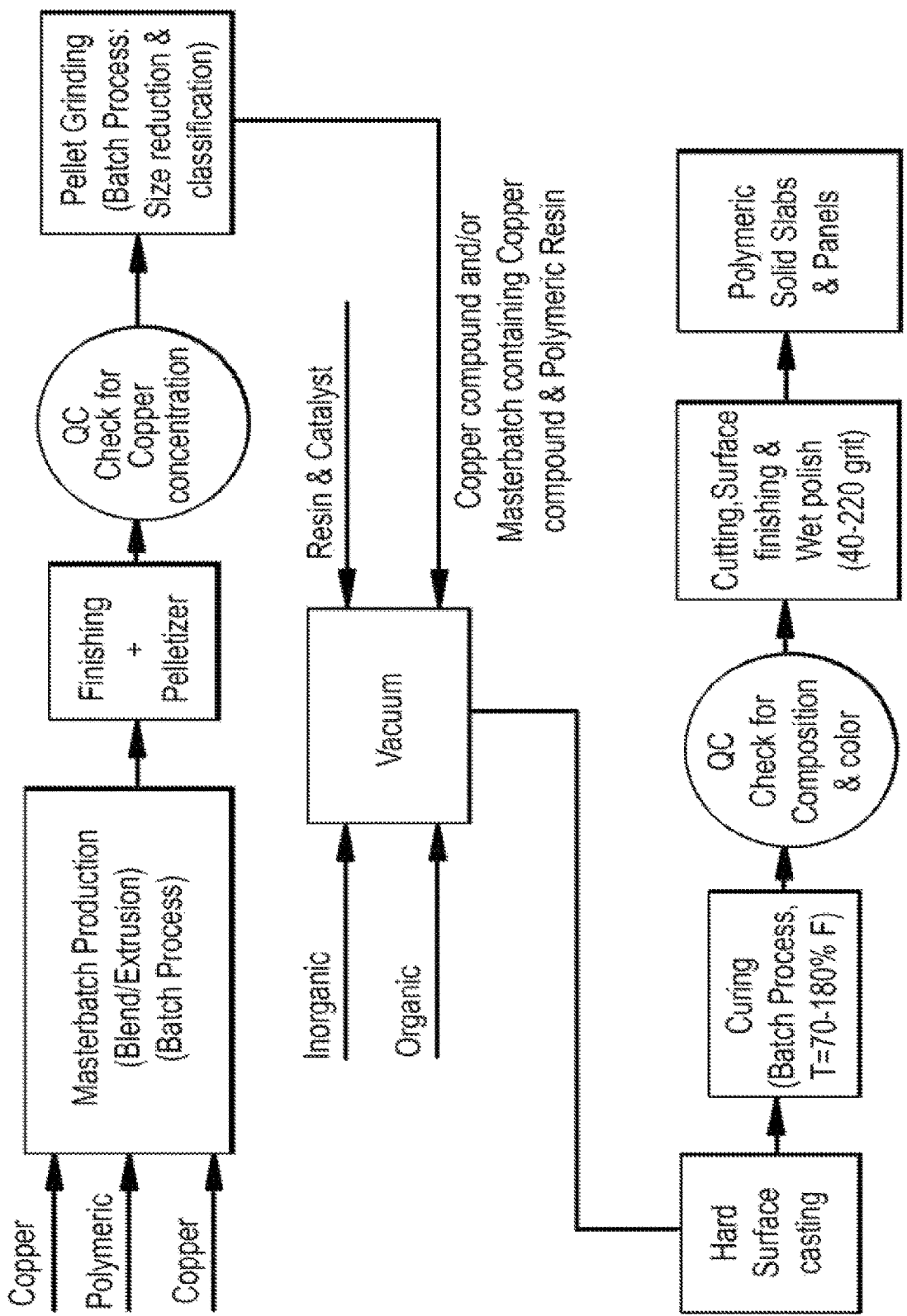
FIG. 3 depicts a block diagram of an embodied process for producing an embodied composite structural solid material of this invention. According to the aspect described in this figure, a masterbatch containing polymeric resin, cuprous oxide, cupric oxide or a combination thereof and pigments is prepared. The materials are blended and extruded at a high temperature to produce masterbatch pellets, whose copper oxide concentration is verified. The pellets of polymeric resin containing copper oxide are then sized and classified before being added to polymeric resin with catalyst, and more organic and inorganic pigments. At this stage the copper oxide can be included as a powder or the masterbatch pellets or a combination of both to the polymeric resin and catalyst. These materials are mixed optionally under pressure in a vacuum and the mixture is then extruded and moulded and cast into a hard surface, before being cured between 20 and 90° C. The hard surface is then tested for composition and color before being finished and polished using a wet sanding process at 40-220 grit and a polymeric solid panel has been produced.

As demonstrated herein, according to some embodied methods and composite materials of this invention, such materials or materials produced thereby, exhibited rapid and effective microbiocidal activity, which will find application against a multitude of microbes, including bacteria and fungi, including spores, and viruses. In fact, as demonstrated herein, when a solid material prepared according to the Examples described herein below was brought into contact with Gram-positive bacteria, Gram-negative bacteria, and fungal species as shown in FIG. 2, a 99.9% reduction in microbial count was evidenced within 2 hours and a 90% reduction in spore count was evidenced within 24 hours.

Thus, this invention provides a method and product for high copper loading within a solid material. Accordingly, it is an object of this invention to provide composite structural solid materials with high copper oxide and copper compound loadings, as herein described.

In some embodiments, this invention provides a composite structural solid material comprising a polymeric resin and copper oxide particles substantially uniformly dispersed therein optionally further comprising a filler material, wherein said copper oxide is present at a concentration ranging from 10% to 50% w/w % and wherein a portion of said copper oxide particles are surface exposed.

In some embodiments, this invention provides a composite structural solid material comprising a polymeric resin and copper particle containing compound substantially uniformly dispersed therein optionally further comprising a filler material, wherein said copper particle containing compound is present at a concentration ranging from 10% to 50% w/w % and wherein a portion of said copper particles are surface exposed.

In some embodiments, such copper particle containing compound may include copper iodide, copper thiocyanate, and in some embodiments, such processes and materials produced thereby may make use of a copper-containing masterbatch as herein described. In some embodiments, the masterbatch is prepared/composed of materials as described in PCT International Application Publication Number WO 2006/100665, which is hereby incorporated fully by reference herein. In some embodiments, the copper containing compounds include a copper salt, for example, copper chloride, copper fluoride, copper sulfate, and others as will be appreciated by the skilled artisan.

In some embodiments, this invention provides a finished product comprising a composite structural solid material as herein described.

In some embodiments, this invention provides a finished product comprising a composite structural liquid binding material herein described that can be incorporated into structural laminations, sprayed or painted on to a surface and will harden to provide an antimicrobial surface.

In some embodiments, the composite structural solid material is an artificial or synthetic marble. In some embodiments, the terms 'artificial or synthetic marble' refers to a material used in building products, which may replace surfaces normally made of quarried, cut, and polished marble stone. The term should be understood to include, inter alia, any solid surface for application in a setting where a hard surface is desirable.

In some embodiments, the composite structural solid materials of this invention, including artificial marbles as herein described, comprise marble, onyx and other solid surface materials quartz surfacing and agglomerated stone, which are present as part of a resin matrix, which in some embodiments, may further comprise a filler.

In some embodiments, use of the cultured marble as herein envisioned includes use of a gel coating of unfilled unsaturated polyester on a substrate of a filled unsaturated polyester. The filler, in some embodiments, may comprise calcium carbonate or similar materials, as will be appreciated by the skilled artisan.

In some embodiments, use of onyx as herein envisioned includes use of a gel coat of unfilled unsaturated polyester on a substrate of filled unsaturated polyester. The filler, in some embodiments, may comprise alumina trihydrate.

In some embodiments, the composite structural solid materials of this invention may comprise filled resin material and, and in some embodiments, unlike cultured marble or onyx, may not comprise a gel coat.

In some embodiments, the composite structural solid materials of this invention may make use of a solid surface Corian® material (E. I. du Pont de Nemours and Company, Wilmington, Del.), which comprises an acrylic matrix filled with alumina trihydrate, which is further modified as herein described to incorporate copper oxide particles substantially uniformly dispersed therein at a concentration ranging from >10% to 50% w/w % and wherein a portion of said copper oxide particles are surface exposed.

In some embodiments, the composite structural solid materials of this invention may make use of a quartz surface material such as Silestone, Ceasarstone, or Zodiaq® material, (E. I. du Pont de Nemours and Company, Wilmington, Del.), which comprises unsaturated polyester matrix filled with quartz or other similar fillers, which is further modified as herein described to incorporate copper oxide particles substantially uniformly dispersed therein at a concentration ranging from 10% to 50% w/w % and wherein a portion of said copper oxide particles are surface exposed.

The composite structural solid materials of this invention will, in some embodiments, comprise a polymeric resin.

In some embodiments, the resin is made from a syrup comprising an acrylic group polymer dissolved in a material selected from the group of an acrylic group monomer solution and a mixed monomer solution containing a vinyl monomer for copolymerization with an acrylic group monomer as a main component; the filler is alumina trihydrate; and the antimicrobial agent comprises copper oxide.

In some embodiments, the composite structural solid materials may be referred to herein synonymously as a "resin matrix" or "matrix". The term "matrix" as used herein will be understood to include reference to a polymeric resin component in which fillers and other additives may be dispersed.

In some embodiments, the polymeric resins of this invention of which envisioned resin matrices will be comprised include thermoplastic resins, thermoset resins, and combinations thereof.

In some embodiments, the thermoplastic resins may comprise any thermoplastic resin known in the art and appropriate for the envisioned application, for example, but without limitation, such thermoplastic resins may include olefins (such as low and high density polyethylene and polypropylene), dienes (such as polybutadiene and Neoprene elastomer), vinyl polymers (such as polystyrene, acrylics, and polyvinyl chloride), fluoropoymers (such as polytetrafluoroethylene) and heterochain polymers (such as polyamides, polyesters, polyurethanes, polyethers, polyacetals and polycarbonates). Thermoset resins include phenolic resins, amino resins, unsaturated polyester resins, epoxy resins, polyurethanes, and silicone polymers. ABS, SAN, ASA.

In some embodiments, the epoxy resins may comprise any epoxy resin known in the art and appropriate for the envisioned application, for example, but without limitation, such epoxy resins may include bisphenol type A, bisphenol type F, phenol novolak type, alicyclic epoxy, halogenated epoxy, and cycloaliphatic epoxy resins.

In some embodiments, the polymeric resins may include unsaturated polyester resins, which in turn may include unsaturated polyester resins characterized in that their reactivity is based on the presence of double or triple bonds in the carbon atoms. The acrylic component added to the polyester resin at a rate of approximately 5% by weight in the current blend which would also include polystyrene, methylmethacrylate (MMA), or combinations of poly (styrene)/MMA.

In some embodiments, the polymeric resins may include any resin as herein described to which an additive has been supplied, for example, an additive contributing to the curing/crosslinking of the monomeric units of the resin and catalysts may be incorporated to affect the same.

In some embodiments, the invention contemplates the use of zero-length catalysts, or in some embodiments, the catalyst is non zero-length and is to be considered as part of the polymeric matrices of this invention.

In some embodiments, the polymeric resins may include acrylic resins, which in turn may comprise any known acrylic resin, with non-limiting examples including various kinds of conventional acrylic group monomers, acrylic group partial polymers, vinyl monomers for copolymerization other than acrylic group monomers, or partial polymers. In some embodiments, such acrylic polymers may (meth) acrylic ester. As used herein, "(meth)acrylic" is understood to mean "acrylic and/or methacrylic". Examples of (meth) acrylic esters include methyl(meth)acrylic ester, ethyl (meth)acrylic ester, benzyl(meth)acrylic ester, glycidyl (meth)acrylic ester.

In some embodiments, the acrylic resins may comprise a solid surface such as Corian®, which includes a poly (methyl methacrylate) (PMMA) resin with ATH filler, as described hereinabove, and in some embodiments, the polymeric resins of this invention may comprise a quartz surface such as Zodiaq® material, which compromises an unsaturated polyester (UPE) resin with a quartz or other silica filler. In some embodiments, the composite structural solid material comprising polymeric resins according to this aspect may further contain pigments, reground self material in particulate form and other additives as disclosed in U.S. Pat. Nos. 3,847,865 and 4,085,246 both incorporated by reference herein.

In some embodiments, the composite structural solid materials of this invention may further comprise a filler, which in turn may comprise any known appropriate filler material as will be appreciated by the skilled artisan. Nonlimiting examples of such filler material may include quartz, quartz powder, silica powder, stone powder, broken glass shards, calcium carbonate, talc, aluminum trihydrate and additives of Thixotropic Agents such as fumed silica, and organo-clays, and others as will be appreciated by the skilled artisan. In some embodiments, the amount of filler versus polymeric resin incorporated within the composite structural solid materials of this invention will be proportions appropriate for the particular applications for the material being produced, as will be appreciated by the skilled artisan.

In some embodiments, the polymeric resin comprises epoxy, acrylic or polyester resins and in some embodiments the polymeric resin comprises thermoplastic resins, thermoset resins or a combination thereof. In some embodiments, the composite structural solid material further comprises calcium carbonate, marble, granite, quartz, feldspar, marble and quartzite and mixtures thereof.

In some embodiments, the composite structural solid material further comprises a filler material, as described herein, which filler material comprises fumed silica, sand, clay, fly ash, cement, broken ceramics, mica, silicate flakes, broken glass, glass beads, glass spheres, mirror fragments, steel grit, aluminum grit, carbides, plastic beads, pelletized rubber, ground polymer composites, wood chips, sawdust, paper laminates, pigments, colorants, and mixtures thereof.

In some embodiments, the ATH filler makes up to between 10% and 30% by weight of the total composition.

In some embodiments, the ATH and/or quartz (silica) dust for the compaction method (very hard material) makes up 20 to 70%.

In some embodiments, the thickener (fumed silica) is about 5% to 30% for the sprayable/paintable application.

The composite structural solid materials of this invention will comprise copper oxide particles substantially uniformly dispersed therein, present at a concentration ranging from 10% to 50% w/w %

According to this aspect, and in some embodiments, a portion of said copper oxide particles are surface exposed.

In some embodiments, as a function of the process for the preparation of the composite structural solid materials of this invention, copper oxide particles are incorporated in a manner whereby the copper oxide particles do not undergo any chemical interaction with the compounds in a slurry preparation used in the preparation of the composite structural solid materials of this invention due to a pretreatment of the powder of a silicate, PMMA, polyester wax or other encapsulating material.

According to this aspect, and in some embodiments, the copper oxide particles are uniformly dispersed in the resin matrices as herein described.

In some embodiments, the uniform dispersion of the antimicrobial copper oxide particles imparts uniform biocidal or biostatic activity throughout the bulk of the solid surface polymeric panel material of the invention and not only on the surface of the solid surface polymeric panel material.

In some embodiments, according to this aspect, such uniformly distributed antimicrobial characteristics dispersed throughout the solid material are particularly useful when surface imperfections in some of the chosen solid surface polymeric panel material of the inventions introduced with use over time are addressed, for example, by scraping one or more surface of uppermost layers, which to date, with other surface treated materials would result in a surface no longer characterized by antimicrobial activity. According to this aspect of the invention, the fact that the copper oxide particles are uniformly distributed to be dispersed throughout the solid material allows for removal of one or more surface layers while providing a new, clean exposed surface still characterized by effective antimicrobial activity.

In some embodiments, the copper oxide particles are present in an amount that imparts antimicrobial activity to the composite structural solid material, such that such activity is readily determined on an exposed surface of the material when in contact with a microbial species.

In some embodiments, such antimicrobial effectiveness may provide microbicidal or microbistatic activity, which for example, may provide a 3-log reduction in microbe count, within 2 hours of exposure to, or for example, may provide a more than 90% reduction in spore count, following exposure to the composite structural solid materials of this invention, as demonstrated via the results obtained with an "Antimicrobial Hard Surface Test" and "Antimicrobial Hard Surface Wipe Test" as herein described.

Without being bound by theory, according to this aspect, the antimicrobial efficacy imparted by the copper oxide particles incorporated within the materials as herein described may be due to the release of copper ions into the exposed milieu. While the preferred mode of efficacy is via a water or vapor bridge it has been surprisingly found that even in what appears to be a dry surface there is efficacy which is possibly due to the water in the microbes themselves.

In some embodiments, the copper oxide particles have a size ranging from about 0.1 to about 20 microns, and in some embodiments, the copper oxide particles have a size ranging from about 1 to about 20 microns, and in some embodiments, the copper oxide particles have a size ranging from about 5 to about 20 microns, and in some embodiments, the copper oxide particle have a size ranging from about 5 to about 10 microns and remain the same size after the formation of the solidified material.

In some embodiments, the "composite structural solid materials" of this invention include non-porous composites of finely divided mineral fillers dispersed in an organic polymer matrix. In some embodiments, the term "organic polymer matrix" is synonymous with resin "matrix".

In some embodiments, this invention provides a finished product comprising a composite structural solid material as herein described.

In some embodiments, such finished product may comprise a tabletop, a countertop, architectural facings and moldings, walkways, home finishing, patio furniture, hospital furniture, hospital bed fittings, handles, decorative stone, indoor and outdoor tile, flooring, mantles, wall facings both cladding sheets and decorative surfacing (painting), bathroom fixtures, imitation stone structures cast and molded structures, and other related materials for which incorporation of the composite structural solid material there within is appropriate.

In some embodiments, some envisioned finished products may include bathroom vanity tops, sinks, shower stalls, floor pans, wall panels, and trim pieces, and kitchen counter tops and floor tiles, as well as other functional and/or decorative surfaces. In some embodiments, some envisioned finished products may include furniture, lining materials and in stationary small articles. In some embodiments, some envisioned finished products may include any surfaces encountered in health settings, where the incidence of exposure to pathogenic microorganisms may be greater. According to this aspect, and in some embodiments, some envisioned finished products may include any surfaces encountered in hospitals, hospice, nursing homes, physicians or other health therapist offices, as well as in commercial and residential food preparation facilities.

In some embodiments, some envisioned finished products may include any surfaces which may be contacted as part of a regimen for ensuring personal hygiene, such as bathroom facilities.

In some embodiments, the finished products of this invention include materials useful for decorative solid surfaces such as, for example, those used as building products such as bathroom vanity tops, sinks, floor tiles, shower stalls and kitchen countertops. Furniture, sanitary use, lining materials, and various articles such as office supplies and store fixtures may also be envisioned finished materials, as well as a laminate or other material comprising a very thin coating of the composite structural solid material.

In some embodiments, such finished products may also comprise surfaces in home bathrooms, public restrooms, swimming pool areas, dormitories, stadiums, and athletic facilities: sinks, counter tops, shower walls and bases, floor tiles, and other walls that become wet during use. In some embodiments, such finished products may also comprise surfaces in medical care facilities, such as hospitals, clinics, medical vans, and nursing homes, the current invention provides antimicrobial protection in the form of surfaces for counter tops, sinks, shower walls and bases, floor tiles, and back splashes in, for example, patient rooms, laundry rooms, soiled linen areas, staff and visitor areas, intensive care and coronary care units and hallways.

The finished products and/or composite structural solid materials of this invention may also find application in offering antimicrobial protection where there is both direct and indirect food contact with the same. Some examples are: counter tops, sinks, back splashes, floors, and table tops in kitchens; table tops, salad bar counters and shields, food lag areas, dirty dish areas, and dish washing and drying areas in restaurants and fast food establishments; certain areas in slaughterhouses where the nutrient insult is not excessive; table, counter top, floors, and back splash areas in canning, freezing, red meat packing, and bread and pastry production facilities; and grocery and fresh food counter tops, displays, and other fixtures in a grocery store.

In some embodiments, the composite structural solid materials of this invention are useful in inhibiting and destroying many common harmful micro-organisms encountered in the home, health care, and food preparation environment. Microorganisms commonly found in such environments, for example, when such environments remain wet, moist, or damp, include bacteria, yeasts, fungi and viruses. Examples include, but are not limited to various Gram positive and Gram negative bacteria, fungi, and viruses, including, but not limited to *Escherichia coli, Candida albicans, Staphylococcus aureus, Salmonella choleraesuis, Listeria weshimeri*, and *Klebsiella pneumonia.*

In some embodiments, the composite structural solid material is cast into a sheet. In some embodiments, the composite structural solid material is cast using a compression molding process. In some embodiments, the composite structural solid material is cast using an extrusion process. In some embodiments, the composite structural solid material is cast using an injection molding process.

In some embodiments, the composite structural solid material is first prepared as a viscose mixture in which the copper oxide powder ultimately is in suspension, which when sprayed or applied, following evaporation of the solvent will provide a hardened solid film on top of a surface to which the spray/formulation was applied. In some embodiments, such application results in a multi-layer film, which is characterized in that such film comprises a polymeric resin and copper oxide particles substantially uniformly dispersed therein, wherein said copper oxide is present at a concentration ranging from 10% to 50% w/w % and wherein a portion of said copper oxide particles are surface exposed.

It is to be understood that the composite structural solid materials of this invention comprise copper oxide particles substantially uniformly dispersed therein, wherein the copper oxide is present at a concentration ranging from 10% to 50% w/w %, or in some embodiments, at a concentration ranging from 8% to 60% w/w %, or in some embodiments, at a concentration ranging from 15% to 40% w/w %, or in some embodiments, at a concentration ranging from 15% to 30% w/w %.

In some embodiments, this invention provides a continuous pour process for the manufacture of a composite structural solid material comprising a polymeric resin and copper oxide particles substantially uniformly dispersed therein the process comprising the steps of:

mixing a polymeric resin or a filler with copper oxide until well blended to form a resin-copper oxide paste or filler-copper oxide blend;

stepwise, subsequently mixing said resin-copper oxide paste or filler-copper oxide blend with a filler or resin, respectively and optionally a pigment to form a copper oxide containing blended composition;

stepwise, subsequently mixing a catalyst with said copper oxide containing blended composition to form a polymerizable composite structural material;

distributing said polymerizable composite structural material in a mold; and providing conditions for polymerization of said polymerizable composite structural material, thereby preparing a composite structural solid material.

In some aspects, the step providing for the subsequent mixing of a catalyst with said copper oxide containing blended composition to form a polymerizable composite structural material, refers to the formation of a material, which can be causally or non-causally made to cure/harden.

In some embodiments, this invention provides a mixed batch process for the manufacture of a composite structural solid material comprising a polymeric resin and copper oxide particles substantially uniformly dispersed therein the process comprising the steps of:
- mixing a polymeric resin, a filler and optionally a pigment;
- mixing a catalyst with a mixture of said polymeric resin, filler and optionally said pigment;
- simultaneously mixing copper oxide or a copper oxide containing composition with said catalyst to said mixture of said polymeric resin, filler and optionally said pigment or stepwise mixing copper oxide or a copper oxide containing composition with said mixture of said polymeric resin, filler and optionally said pigment and said catalyst to form a polymerizable composite structural material;
- distributing said polymerizable composite structural material in a mold; and
- providing conditions for polymerization of said polymerizable composite structural material, thereby preparing a composite structural solid material In some embodiments, this invention provides a process for the manufacture of a composite structural solid material comprising a polymeric resin and copper oxide particles substantially uniformly dispersed therein the process comprising the steps of:
- mixing a polymeric resin and pigment well;
- stepwise adding a catalyst to a mixture of said polymeric resin and pigment to form a catalyst-containing polymeric resin mixture;
- optionally stepwise adding a filler to said catalyst-containing polymeric resin mixture to form a filler-catalyst-containing polymeric resin mixture;
- stepwise or simultaneously adding a copper oxide or copper oxide containing composition to said catalyst-containing polymeric resin mixture or said filler-catalyst-containing polymeric resin mixture to form a copper oxide containing polymeric resin, pigment, and catalyst mixture,
- distributing said copper oxide containing polymeric resin, pigment, and catalyst mixture in a mold, optionally while applying a vacuum; and
- curing said copper oxide containing polymeric resin, pigment, and catalyst mixture, optionally with the application of pressure, thereby preparing a composite structural solid material.

In some embodiments, the copper oxide powder will comprise $Cu_2O$ and in some embodiments, the copper oxide powder will comprise CuO, and in some embodiments, the copper oxide powder will comprise mixtures thereof. In the preferred embodiment size can vary and the process can take particle sizes of up to 20 microns with an embodied size of between 5 and 10 microns envisioned. In some embodiments, particle sizes of 0.1 to 20 microns are envisioned.

Further is shown a system for entry of the copper oxide into the material which allows for molding and casting of the material by retarding the solidification that is caused by both the catalyst of the compound and the copper oxide. Under normal circumstances both the catalyst and the copper oxide alone would cause almost instantaneous congealing of the mixture but it was surprisingly found that when the catalyst and the copper oxide were mixed together as a last step or when the copper oxide was added as the final ingredient, or when a blend of the copper oxide and filler or when a paste of the copper oxide and resin is formed, the congealing was delayed.

It was surprisingly found that the manipulation of specific steps in the process of preparation of the composite materials could significantly impact the ability to arrive at a uniform distribution and optimized production of the composite solid materials as herein described.

It was further surprisingly found that the catalyst could be added at the very beginning of the mixing process and the copper oxide could be added as the last stage of mixing and that such order also delayed the congealing.

In one embodiment it was found that the copper oxide when added as the last step in the process caused a retardation of the congealing of the slurry and that as long as the copper oxide was added in a final stage there was a delay in the congealing that allowed for application to end uses such as a spray application.

This invention also provides a method for imparting antimicrobial activity to a composite structural solid material, said method comprising preparing a composite structural solid material containing copper oxide dispersed therein, wherein said copper oxide is present at a concentration ranging from 10 to 50% w/w % and wherein a portion of said copper oxide particles are surface exposed.

In some embodiments, an exposed surface of said composite structural solid material has an antimicrobial reduction activity representing a 90% reduction of microbial units within 24 hours of sample incubation.

In some embodiments, an exposed surface of said composite structural solid material is characterized in its ability to be repeatedly exposed to organism challenge while maintaining said antimicrobial reduction activity during a period of time within said 24 hours of sample incubation.

In some embodiments, the antimicrobial activity represents bactericidal, sporicidal, or bacteriostatic activity and in some embodiments, the antimicrobial activity represents fungicidal, viricidal, fungistatic or viristatic activity.

EXAMPLES

Example 1

Methods for Producing Copper Containing Composite Structural Solid Materials: Batch Mix Process For the preparation of a polymeric solid material, the following ingredients may be used: Alumina trihydrate (ATH), Pigments, Resin and Methyl ethyl ketone peroxide (MEKP) catalyst. The process may be as follows:
1. The ATH and fillers were mixed in a dry vessel.
2. Resin and pigments were then added and mixed thoroughly.
3. The MEKP catalyst was then mixed into the contents of 1 and 2 above and mixed thoroughly.
4. The mixed slurry was added to a mold.
5. The mold was placed in a vacuum chamber preferably with a vibration action to remove air bubbles that are entrapped in the slurry which began to solidify within minutes. A normal initial solidification time was 15 to 30 minutes.
6. The solid surface slab or product was placed in a curing oven at 80 C for 30 to 45 minutes.
7. The solid surface slab or product was now removed and prepared for gauging and finish sanding.

The skilled artisan will appreciate that numerous alterations of the protocol may be undertaken as part of routine process execution. When the artisan wishes to include copper oxide within the polymeric starting material for example, it is readily apparent to the artisan that the typical process would include making use of the following ingredients: ATH, PET masterbatch, Copper oxide powder, Pigments, Resin and MEKP catalyst, whereby the process entails thoroughly mixing all ingredients other than MEKP i.e. ATH, PET master batch, copper oxide powder, pigments, and resins. The artisan would conventionally then add MEKP catalyst and mix the combined ingredients thoroughly just prior to casting the mixture into a mold.

When the above process was carried out, however, surprisingly when MEKP was added and mixed into the mixture after the dry ingredients, pigments and resin had been mixed, followed by the addition of copper oxide. When the powder was added to the mixture during the normal formulation for the preparation of a solid surface, which was at the time of the dry materials mixture and then the resin was mixed with the dry materials and finally the MEKP would be added as the last step, upon addition of the MEKP to the final slurred mixture almost instant solidification took place, i.e. the resulting mixture solidified prematurely, so that an uneven semi-hard preparation was attained, which could not readily be cast. Such premature solidification was most pronounced when the copper oxide powder was provided at a w/w concentration of as little as of as little as 2%. Even a 2% level resulted in a speeding up of the solidification process and the higher the concentration, the faster the solidification process occurred.

As stated above when the powder was added in as little amounts of a 3% w/w ratio, it sped up solidification prematurely. Ratios changed as the copper powder level went up as this would mean a decrease in masterbatch in accordance with the rise in the amount of powder in order to maintain enough masterbatch and combined powder to keep the efficacy. This formulation was run at levels of (1) 3.75% powder with 49% masterbatch (2) 4.75% powder with 45% masterbatch (3) 6% powder 40% masterbatch (4) 7% powder with 36% masterbatch (5) 8% powder with 32% masterbatch (6) 9% powder with 28% masterbatch (7) 10% powder with 24% masterbatch. All other parts of the main ingredients kept the same ratios Unexpectedly, when the process instead was carried out with the following order, whereby a mixture of resin and pigments was prepared, and MEKP was added to the mixture, following which, fillers and master batch/treated powder were then mixed into the MEKP-containing premixture, or copper oxide was then mixed into the MEKP-containing premixture, surprisingly, such mixture could be easily cast into a mold, and the process could be readily carried out, even with high concentrations of copper-oxide powders incorporated therein.

As was demonstrated herein, hardening of the mixture was profoundly retarded as a function of the order in which the MEKP and the copper oxide were added to the resin-pigment-containing mixture.

Example 2

Methods for Producing Embodied Copper Containing Composite Structural Solid Materials One embodied process for producing a copper-containing composite structural material of this invention makes use of the following ingredients, and the relative percentages by weight are provided in the parentheses following the same: Alumina Trihydrate (ATH) (7% to 20%), PET masterbatch prepared for example, as described in European Patent Application Number1860949, which contains copper oxide—(up to 40%), copper oxide powder (up to 10%), pigments (up to 3%), resin (between 28-40%) and MEKP catalyst (1%).

An exemplified process may include the steps:

1) Mix all dry ingredients [Alumina Trihydrate at 17% w/w ratio and Masterbatch at 40% w/w ratio] except the copper oxide powder in a first vessel (vessel A).

2) Mix all liquid ingredients except the MEKP [at 1% w/w ratio] in a second vessel (vessel B) [Resin and Pigment at 2% w/w ratio].

3) Add MEKP and mix thoroughly into vessel B.

4) Add the dry ingredients from vessel A into the liquid ingredients in vessel B and mix thoroughly [Add Alumina Trihydrate and Masterbatch from vessel A to Resin and Pigment in Vessel B].

5) Add the copper oxide [6% w/w ratio] to the combined mixture [listed above in previous step] in vessel B and blend rapidly 6) Place the mix into a proper mold spreading evenly 7) Place the mold into a vacuum pressure and vibration chamber 8) Initiate the vibration sequence for 2 to 10 minutes, initiate vacuum pressure for 5 to 30 minutes.

9) Remove initially hardened sheet that remains in the mold from vacuum chamber to cool and cure at ambient temperature for 4 to 24 hours.

10) Heating/Post Curing Stage: This is another surprising discover and major difference from what someone familiar with the art would expect to do. It was found that heat was an impediment to producing quality sheets and therefore was eliminated.

11) The normal post curing in an oven of the slabs was eliminated since it was found that this stage surprisingly kept the slabs from obtaining the hardness of a normal slab.

12) Gauge and sand and polish the slab

13) Inspect for any defects

14) Package for shipment and distribution

It was surprisingly found that with the use of a 20% copper oxide PET master batch a post curing stage could be eliminated. It was also surprisingly found that by adding the copper oxide powder as the last step before casting allowed for a surprising delay in solidification.

It was also surprisingly found that adding the MEKP to the resin prior to the addition of fillers and dry ingredients also delayed the solidification.

Furthermore, when the process was conducted in the absence of applied vibration action during the vacuum process the resulting solid material did not contain air pockets/air bubbles, which would ordinarily be present.

The delay of the chemical hardening in the embodied processes as herein described, was consistently between 20 and 30 minutes which is sufficient time for formation of the desired products.

In one embodiment it was found that 10 micron powder treated with a silicate or PMMA post grinding of powder treatment could be used in place of the master batch or in addition to the master batch to achieve the same effect. Those familiar with the art of master batch synthesis know that copper oxide powders can be treated in a high sheer mixer with a coating ratio of approximately 4 grams of a silicate or PMMA or other inert compound to a kilo of copper oxide powder.

Example 3

The Embodied Copper Containing Composite Structural Solid Materials Exhibit Anti-Microbial Activity Materials and Methods A. Inocula Preparation:

For Bacteria:—Bacteria from stock cultures were transferred into TSB and incubated at 35-37° C. for 24±2 hours. Daily transfers were made for at least three consecutive days (but no more than 10 days). For each transfer, tubes containing 10 mL of TSB were inoculated using two loopfuls (4-mm inside diameter) of inoculum for each tube. A 48±4 hour culture were used for the inocula on the day of testing.

For Fungus: Fungi from stock cultures were transferred into Sarbouraud dextrose broth and incubated at 25-30° C. for 24±2 hours. Daily transfers were made for at least three consecutive days (but no more than 10 days). For each transfer, tubes containing 10 mL of SDB were inoculated using two loopfuls (4-mm inside diameter) of inoculum for each tube. A 48±4 hour culture were used for the inocula on the day of testing.

For both cultures: transfers more than 15 days away from the stock cultures were not be used for the inocula for the test.

For each microorganism, each culture was thoroughly mixed on a vortex-mixer and allowed to settle for ≥15 minutes. The upper two-thirds of each culture was aspirated and used as the inoculum.

B. Addition of organic load: To each prepared inocula, a 0.25 mL aliquot of FBS plus 0.05 mL 1% Triton X-100 solution to 4.70 mL of bacteria suspension to yield a 5% FBS and 0.01% Triton X-100 soil load.

C. Test and Control Carrier Preparation:

The test (three lots, five replicates per lot per microorganism) and control surfaces/carriers (three replicates pre microorganism) plus additional test and control surfaces as required for remaining controls were cleaned by submersion in 70-85% in Isopropyl alcohol, rinsed with sterile deionized water, and allowed to air dry. After drying completely, the carriers were steam sterilized for 15 minutes at 121° C. The carriers were allowed to cool and held at ambient room temperature until use. Prior to use, each carrier was aseptically transferred into plastic Petri dishes (one dish for each carrier) matted with two pieces of filter paper using sterile forceps.

D. Carrier Inoculation:

A 0.02 mL aliquot of the inoculum was transferred onto each sterile carrier using a calibrated micropippetor. The inoculum was spread to within approximately ⅛" of the edge of the carrier. The carriers were allowed to dry with lids ajar for 20-40 minutes under ambient conditions. The exposure period (contact time) began immediately after drying.

E. Test:

For each microorganism per lot, five inoculated and dried carriers were held for the exposure (contact) time. The contact time began immediately after drying in accordance with Section D, Carrier inoculation. At the conclusion of the contact time, each carrier was transferred to a jar containing 20 mL of neutralizer at the appropriate staggered intervals. Each jar was sonicated for five minutes and then rotated by hand to mix. Within one hour after sonication, serial dilutions were prepared using PBS (10-1-10-4). Duplicate 1.0 mL aliquots from each jar/dilution (100-10-4) were plated using pour plates.

For Bacteria: Plates were incubated for 48±4 hours at 35-37° C., colonies were counted and CFU/carrier calculated.

For Fungus: Plates were incubated for 48±4 hours at 25-30° C., colonies were counted and CFU/carrier calculated.

Spore Testing

Note: All manipulations and incubation of the test culture, unless stated otherwise will be conducted under strict anaerobic conditions. All media and reagents will be pre-reduced prior to use.

A. Spore Suspension Preparation:

Using a thawed vegetative frozen stock culture, 100 µL was added into an Erlenmeyer flask containing 10 mL of RCM and incubated for 24±4 hours at 35-37° C. CABA plates were spread with the overnight culture (100 µL/plate) and incubated for 7-10 days 35-37° C. During the incubation period, growth from the plates was checked periodically to inspect the culture and to estimate the approximate ratio of spores to vegetative cells using phase-contrast microscopy. A sample of the growing culture was collected with a sterile inoculating loop on a glass slide containing 10 µL of deionized water and mixed to make a suspension prior to observing by phase-contrast microscopy. Under phase-contrast, the spores appeared bright and ovular, white vegetative cells appear dark and rod shaped.

Once the spores have reached ≥90% spores to vegetative cell ratio, cultures were harvested from each plate by adding 5±1 mL of ST80 to each plate and gently scraping the surface of each plate with a cell scraper to dislodge growth. The harvested material was pooled into a sterile 50 mL centrifuge tube. The tubes containing the suspensions were centrifuged at 4500×g for 15 minutes and washed three times with cold (2-5° C.) ST80. The final pellet in each tube was resuspended in approximately 5 mL of ST80.

Each spore suspension was purified using standard internal procedures and included heat-shocking, washing using ST80 and a 50% (w/v) solution of HistoDenz and centrifugation with resuspension using ST80. The contents of each tube were combined. A sample of the culture was collected with a sterile inoculating loop on a glass slide containing 10 µL of deionized water and mixed to make a suspension prior to observing by phase-contrast microscopy to confirm the presence of ≥90% spores to vegetative cell ratio.

An inoculum count evaluation was performed by serially diluting the prepared suspension using PBS and duplicate aliquots will be plated using BHIY-HT. The plates were incubated for 2-4 days at 35-37° C. The CFU/mL will be documented. The spore suspension was frozen at approximately −70° C. until use on the day of the test.

On the day of the test, the suspension was thawed and A sample of the culture was collected with a sterile inoculating loop on a glass slide containing 10 µL of deionized water and mixed to make a suspension prior to observing by phase contrast microscopy to confirm the presence of ≥90% spores to vegetative cell ratio.

The culture was diluted using PBS to yield approximately $5 \times 10^6$ CFU/mL based on the pre-test inoculum counts. The culture was thoroughly mixed on a vortex mixer and allowed to settle for ≥15 minutes. The upper two-thirds of the culture as aspirated and used as the inoculum.

B. Addition of Organic Load:

A 0.25 mL aliquot of FRS plus 0.05 mL 1% Triton X-100 solution to 4.70 mL of the bacteria spore suspension to yield a 5% FBS and 0.01% Triton X-100 soil load.

C. Test and Control Carrier Preparation:

The test (three replicates per contact time using two contact times) and control surfaces/carriers (two replicates per contact time) plus additional test and control surfaces as required for remaining controls were cleaned by submersion in 70-85% in Isopropyl alcohol, rinsed with sterile deionized water, and allowed to air dry.

After drying completely, the carriers were steam sterilized for 15 minutes at 121° C. The carriers were allowed to cool and held at ambient room temperature until use. Prior to use, each carrier was aseptically transferred into plastic Petri dishes (one dish for each carrier) matted with two pieces of filter paper using sterile forceps.

D. Carrier Inoculation:

A 0.02 mL aliquot of the inoculum was transferred onto each sterile carrier using a calibrated micropippetor. The inoculum was spread to within approximately ⅛" of the edge of the carrier. The carriers were allowed to dry with lids ajar for 20-40 minutes under ambient conditions. The exposure period (contact time) began immediately after drying.

E. Test:

For each contact time, three inoculated and dried carriers were held for the exposure (contact) time. The contact time began immediately after drying in accordance with Section D, Carrier inoculation. At the conclusion of the contact time, each carrier was transferred to a jar containing 20 mL of neutralizer at the appropriate staggered intervals. Each jar was sonicated for five minutes and then rotated by hand to mix. Within one hour after sonication, serial dilutions were prepared using PBS. Duplicate aliquots from each jar/dilution were plated using BHIY-HT plates. All plates were incubated for 2-4 days at 35-37° C., colonies were counted and CFU/carrier calculated.

Testing Protocol and Results: For each challenge organism, three test (for each concentration) and two control surfaces were processed. Using a 48+/− hour culture containing organic load, the test and control surfaces were contaminated with 0.02 mL of the inoculum and the inoculum was spread within approximately ⅛$^{th}$ inch of the edge of the surface. The surfaces were dried with the lids ajar for 40 minutes under ambient conditions (20 C). The contact time was initiated at the conclusion of the drying period.

At the conclusion of the contact time (2 hours), each surface was transferred to a jar containing 20 mL of neutralizer and the jar was sonicated for five minutes. The jar was then rotated by hand to mix. Within one hour, serial dilutions were performed and selected dilutions were plated. Alistair: the test methods are far more extensive than that description—there is a repeated abrasion test (up to 12 wet and dry cycles) and repeated contamination every 2 hours for 24 hours.

The challenge microorganisms were confirmed by colony morphology and Gram stain to be consistent with *Staphylococcus aureus* and *Enterobacteri aerogenes*. All purity control streaks were evaluated in the same manner and both challenge microorganisms were validated to be pure.

Percent reduction was calculated using the following formula:

$$\frac{\text{Avg. Quantitative Carrier Control (CFU/Surface)} - \text{Avg. Test Results (CFU/Surface)}}{\text{Quantitative Carrier Control (CFU/Surface)}} \times 100$$

Example 4

Embodied Copper Containing Composite Structural Solid Materials

Using the following materials and description slabs of synthetic marble for application to hard surfaces were produced.

Ingredients:
ATH—7% to 20%
PET masterbatch which contains copper oxide—up to 40%
Copper oxide powder—10%
Pigments—up to 3%
Resin—between 20-38%
Catalyst—1%

Process:
In a vessel mix resin and pigments together
Add catalyst
Add ATH
Add PET masterbatch (as described in PCT International Application Publication Number WO 2006/100665, which is hereby incorporated fully by reference herein), which has been ground into a coarse powder or copper oxide that has been encapsulated with a silicate or PMMA or some other inert material.
Mix thoroughly.
Cast into mold
Place mold into vacuum chamber and apply vacuum, pressure and vibration. Allow sheet to fully cure prior to gauging and finish sanding.

Using the following materials and description a liquid form of synthetic marble for application to any surface in a paint brush or spray application is described.

Ingredients:
Fumed Silica—7% to 20%
PET masterbatch which contains copper oxide—up to 40%
Copper oxide powder—up to 16%
Pigments—up to 3%
Resin—between 28-75%
MEKP catalyst—1%
MEK thinner 0 to 10%

Process:
In a vessel mix resin and pigments together
Add Fumed Silica
Add PET masterbatch which has been ground into a coarse powder or copper oxide that has been encapsulated with a silicate or PMMA or some other inert material
Mix thoroughly
Add MEK until desired viscosity is reached.
Add MEKP
Immediately spray or paint on to surface Using the following materials and description a flexible slab of a synthetic marble was created for application to, but not limited to, an easy-clean and quiet flooring tiles, bendable moldings around columns and corners, impact resistant bumpers, chair rails, wheel chair tires, escalator hand rail belts, food processing conveyor belts and more scratch resistant surface.

Ingredients:
ATH—7% to 15%
PET masterbatch which contains copper oxide—up to 40%
Copper oxide powder—10%
Pigments—up to 3%
Resin—between 25-33%
MEKP catalyst—0.25-1%

Process:

In a vessel mix resin and pigments together

Add ATH

Add MEKP and mix thoroughly

Add MEKP catalyst and PET masterbatch which has been ground into a coarse powder or copper oxide that has been encapsulated with a silicate or PMMA or some other inert material Mix thoroughly In this case, the resin content was reduced to approximately 25% and the ATH filler was increased to 15% however, these proportions can change depending on the variations in the master batch, resins and MEKP catalysts and the desired qualities of the finished product.

Example 5

Embodied Assays to Assess Antimicrobial Activity of the Copper Containing Composite Structural Solid Materials Inocula Preparation:

For *Staphylococcus aureus*: Bacteria from stock cultures were transferred into TSB and incubated at 35-37° C. for 24±2 hours. Daily transfers were made for at least three consecutive days (but no more than 10 days). For each transfer, tubes containing 10 mL of TSB were inoculated using two loopfuls (4-mm inside diameter) of inoculum for each tube. A 48±4 hour culture was used for the inocula on the day of testing.

For *Enterobacter aerogenes*: Bacteria from stock cultures were transferred into TSB and incubated at 25-30° C. for 24±2 hours. Daily transfers were made for at least three consecutive days (but no more than 10 days). For each transfer, tubes containing 10 mL of TSB were inoculated using two loopfuls (4-mm inside diameter) of inoculum for each tube. A 48±4 hour culture was used for the inocula on the day of testing.

For each microorganism, each culture were thoroughly mixed on a vortex-mixer and allowed to settle. The upper two-thirds of each culture were aspirated and used as the inoculum. Transfers more than 15 days away from the stock cultures will not be used for the inocula for the test.

Addition of Organic Load:

To each prepared inocula, a 0.25 mL aliquot of PBS plus 0.05 mL 1% Triton X-100 solution to 4.70 mL of bacteria suspension to yield a 5% FBS and 0.01% Triton X-100 soil load.

Test and Control Carrier Preparation:

The test and control surfaces were cleaned by submersion in 70-85% in Isopropyl alcohol, rinsed with sterile deionized water, and allowed to air dry. After drying completely, the carriers were steam sterilized for 15 minutes at 121° C. The carriers were allowed to cool and held at ambient room temperature until use. Prior to use, each carrier were aseptically transferred into plastic Petri dishes (one dish for each carrier) matted with two pieces of filter paper using sterile forceps.

For each lot of the test material, per microorganism, five sets of with five replicate carriers per set were prepared along with five sets per microorganism of the control material with three replicate carriers each for the primary aspects of the test.

Additional surfaces were prepared as required for remaining controls.

Test:

All test surfaces were inoculated at staggered intervals with 5 ul of the challenge microorganism using a calibrated pipette. The inoculum was spread to within approximately ⅛" of the edge of the carrier. This initial inoculation was considered as "time zero". The carriers were dried at ambient conditions for the duration of exposure. The exposure period(s) begins with the initial "time-zero" inoculation. The applicable sets not removed for quantitative recovery (see below) were reinoculated in the same manner at 3, 6, 9, 12, 15, 18, and 21 hours post "time-zero" inoculation.

The applicable sets for quantitative recovery were removed at 2 (single inoculation), 6 (two inoculations), 12 (four inoculations), 18 (six inoculations), and 24 (8 inoculations) hours. At the conclusion of the applicable contact time for each set of surfaces, each carrier were transferred to a jar containing 20 mL of neutralizer at the appropriate staggered intervals. Each jar were sonicated for five minutes and then rotated by hand to mix. Within one hour after sonication, serial dilutions were prepared using PBS (10-1-10-4). Duplicate 1.0 mL aliquots from each jar/dilution (100-10-4) were plated using TSA pour plates.

For *Staphylococcus aureus*: Plates were incubated for 48±4 hours at 35-37° C., colonies were counted and CFU/carrier calculated.

For *Enterobacter aerogenes*: Plates were incubated for 48±4 hours at 25-30° C., colonies were counted and CFU/carrier calculated.

Controls:

Carrier Quantitation Control:

For each challenge microorganism, a parallel control were run using the control carriers (surfaces) in the same manner as the test (inoculation and quantitative recovery) with the exception that three replicates were evaluated rather than five. All plates were incubated appropriately in the same manner as the test plates as applicable for each challenge microorganism.

Culture Purity Control:

Each prepared culture was streaked for isolation using TSA. All plates were incubated appropriately in the same manner as the test plates as applicable for each challenge microorganism. The isolated cultures were observed for purity.

Organic Soil Sterility Control:

Duplicate 1.0 mL aliquots of the prepared organic soil were plated in TSA pour plates. The plates were incubated for 48±4 hours at 35-37° C. and observed for growth or no growth.

Inoculum Confirmation Counts Control:

Each prepared inoculum was serially diluted using PBS and selected dilutions were plated in duplicate using TSA pour plates. All plates were incubated appropriately in the same manner as the test plates as applicable for each challenge microorganism.

Neutralizer Sterility Control:

A single jar of containing the neutralizer was incubated for 48±4 hours at 35-37° C. The neutralizer was observed for growth or no growth.

Carrier Sterility Control:

An uninoculated test (per lot) and control carrier were subcultured into independent jars containing the neutralizer and incubated for 48±4 hours at 35-37° C. The neutralizer was observed for growth or no growth.

Carrier Viability Control:

For each challenge microorganism, a single inoculated control carrier was subcultured into a jar containing the neutralizer and incubated in the same manner as the test plates as applicable for each challenge microorganism.

The neutralizer jars were observed for growth or no growth.

Neutralizer Effectiveness Control:

For each challenge microorganism, per lot of the test article, a single sterile test carrier was neutralized in the same manner as the test (transferred into individual jars containing 20 mL of neutralizer. To each jar, a 1.0 mL aliquot of the diluted inoculum was added to yield 100 CFU/mL in the neutralizer. The jar was mixed and a 1.0 mL aliquot was removed and plated in duplicate.

A numbers control were performed in the same manner with the exception that a sterile control carrier was used.

All plates were incubated appropriately in the same manner as the test plates as applicable for each challenge microorganism.

Microorganism Confirmation Procedures:

A randomly selected colony from the carrier quantitation control plates, and if applicable, a randomly selected colony from a test plate was confirmed by colony morphology and Gram stain according to extant SOPs. The same procedures were performed using the culture purity control plates and the result regarding purity was documented as well.

Inocula Preparation:

Bacteria from stock cultures were transferred into TSB and incubated at 35-37° C. for 24±2 hours. Daily transfers were made for at least three consecutive days (but no more than 10 days). For each transfer, tubes containing 10 mL of TSB were inoculated using two loopfuls (4-mm inside diameter) of inoculum for each tube.

The pellicle formed in the *Pseudomonas aeruginosa* culture was aspirated before use.

For all cultures: transfers more than 15 days away from the stock cultures will not be used for the inocula for the test.

For the Initial and Final Sanitizer Tests Inoculum:

For each challenge microorganism, a 48-54 hour culture was mixed on a vortex and allowed to stand for 15±1 minutes. Addition of organic load: a 0.25 mL aliquot of FBS plus 0.05 mL 1% Triton X-100 solution to 4.70 mL of bacteria suspension to yield a 5% FRS and 0.01% Triton X-100 soil load. The upper two-thirds of each culture were aspirated and used as the inoculum.

For the inoculation/reinoculations of the carriers used in the simulated wears tests: For each challenge microorganism, an 18-24 hour culture were mixed on a vortex and allowed to stand for 15±1 minutes. The upper two-thirds of each culture were aspirated and used as the inoculum. Two 1:100 dilutions of the culture were made using sterile deionized water (two 0.1 mL to 9.9 mL serial dilutions) and one final dilution of 5.0 mL of the diluted suspension to 5.0 mL of sterile deionized water. Addition of organic load: a 0.25 mL aliquot of FRS plus 0.05 mL 1% Triton X-100 solution to 4.70 mL of bacteria suspension to yield a 5% FBS and 0.01% Triton X-100 soil load. Note: No culture was allowed to stand with organic load longer than eight hours.

Test and Control Carrier Preparation:

The test and control surfaces (carriers) were cleaned by submersion in 70-85% in Isopropyl alcohol, rinsed with sterile deionized water, and allowed to air dry. After drying completely, the carriers were steam sterilized for 15 minutes at 121° C. The carriers were allowed to cool and held at ambient room temperature until use. Prior to use, each carrier was aseptically transferred into plastic Petri dishes (one dish for each carrier) matted with two pieces of filter paper using sterile forceps. For each lot of the test material, per microorganism, two sets of with four replicate carriers per set were prepared along with two sets per microorganism of the control material with four replicate carriers each for the primary aspects of the test. Additional surfaces were prepared as required for remaining controls.

Initial Sanitizer Evaluation Test:

For each lot of the test surface, per microorganism, four carriers and four control surface carriers (per microorganism) were inoculated at staggered intervals with 10 µL (0.01 mL) of the prepared initial sanitizer inoculum using a calibrated pipette. The inoculum were spread to within approximately ⅛" of the edge of the carrier and the carriers were allowed to dry for 30-40 minutes at 35-37° C., at a 38-42% relative humidity (RH). Immediately after drying, the 120 minute contact time (exposure period) was at ambient temperature. At the conclusion the 120 minute contact time, each carrier was transferred to a jar containing 30 mL of neutralizer at the appropriate staggered intervals. Each jar was sonicated for 20±2 seconds. The samples were mixed on an orbital shaker for 3-4 minutes at 250 rpm. Within one hour after sonication, serial dilutions was prepared using sterile deionized water ($10_{-1}$-$10_{-4}$). Duplicate 1.0 mL aliquots from each jar/dilution ($10_{0}$-$10_{-2}$) were plated using TSA pour plates. Duplicate 1.0 mL aliquots from each jar/dilution ($10_{-1}$-$10_{-4}$) for the control carriers was plated using TSA pour plates.

Note: All dilutions and plating for each replicate carrier were performed within one hour of the transfer into the neutralizer. All test plates were incubated for 48±4 hours at 35-37° C., colonies were counted and CFU/carrier calculated.

Simulated Wear and Reinoculation:

Prior to inoculation, the abrasion tester were set to a speed of 2.25-2.50 for a total surface contact time of approximately 4-5 seconds for one complete cycle. The speed was measured with a calibrated stopwatch. The machine's cycle were calibrated by adjusting the number counter to 1, 5, 10, and 20 and verifying cycle time. It was set so that one pass on the abrasion tester with the surfaces is equal to a contact time of approximately 2-seconds. A wear cycle will equal one pass to the left and a return pass to the right on the Gardner scrubber with an abrasion boat fitted with a foam liner and dry cotton cloth. The fully-assembled abrasion boat will consist of two weights, a foam liner and a cotton cloth. It was assembled in an aseptic manner. The weight of the fully assembled weight boat was verified to weigh 1084±1 g prior to use. For each lot of the test surface, per microorganism, four carriers were inoculated at staggered intervals with 10 µL (0.01 mL) of the prepared simulated wears inoculum using a calibrated pipette. The inoculum was spread to within approximately 1/8" of the edge of the carrier and the carriers were allowed to dry for 30-40 minutes at 35-37° C. These inoculation and drying procedures were designated as "reinoculated and drying". To initiate the wear cycles, each carrier were subjected to a dry wear cycle using the Gardea Washability and Wear Tester and the fully-assembled weight boat. At least 15 minutes after the initial wear cycle; each carrier was reinoculated and dried as previously described. Each carrier was subjected to a wet wear cycle using the Gardea Washability and Wear Tester and the fully-assembled weight boat. The fully-assembled weight boat was sprayed for one second with sterile deionized water using a Preval sprayer (or equivalent) from a distance of 75±1 cm for not more than one second. At least 15 minutes after this secondary wear cycles, each carrier was reinoculated and dried, and subjected to alternating dry and wet wears until a total of 11 reinoculations and 12 wear cycles were performed in accordance with the procedures and timeline outlined in enumerated list below.

Note: The surface holder on the Gardner apparatus was decontaminated with 70% IPA between each set of surface wears to prevent carryover contamination. The IPA was allowed to completely evaporate before proceeding. The foam liner and the cotton cloth were replaced between each set of surface wears.

Wear and Reinoculation Procedure
1. Initial inoculation and drying
2. Wear cycle with dry cloth (wear #1)
3. Reinoculation and drying
4. Wear cycle with moist cloth (wear #2)
5. Reinoculation and drying
6. Wear cycle with dry cloth (wear #3)
7. Reinoculation and drying
End of First Day
8. Wear cycle with moist cloth (wear #4)
9. Reinoculation and drying
10. Wear cycle with dry cloth (wear #5)
11. Reinoculation and drying
12. Wear cycle with moist cloth (wear #6)
13. Reinoculation and drying
14. Wear cycle with dry cloth (wear #7)
15. Reinoculation and drying
16. Wear cycle with moist cloth (wear #8)
17. Reinoculation and drying
18. Wear cycle with dry cloth (wear #9)
19. Reinoculation and drying
20. Wear cycle with moist cloth (wear #10)
21. Reinoculation and drying
22. Wear cycle with dry cloth (wear #11)
23. Reinoculation and drying
24. Wear cycle with moist cloth (wear #12)

Final Sanitizer Evaluation is Performed after the 12th Wear Cycle and Two Days after the Initial Inoculation Final Sanitizer Evaluation: (Performed at least two days after the initial inoculation to the Simulated Wear and Reinoculation procedures) For each lot of the test surface, per microorganism, four carriers and four control surface carriers (per microorganism) were inoculated at staggered intervals with 10 µL (0.01 mL) of the prepared final sanitizer inoculum using a calibrated pipette. The inoculum were spread to within approximately ⅛" of the edge of the carrier and the carriers were allowed to dry for 30-40 minutes at 35-37° C., at a 38-42% relative humidity (RH). Immediately after drying, the 120 minute contact time (exposure period) were in at ambient temperature. At the conclusion the contact time, each carrier were transferred to a jar containing 30 mL of neutralizer at the appropriate staggered intervals. Each jar were sonicated for 20±2 seconds. The samples will then be mixed on an orbital shaker for 3-4 minutes at 250 rpm. Within one hour after sonication, serial dilutions were prepared using sterile deionized water ($10_{-1}$-$10_{-4}$). Duplicate 1.0 mL aliquots from each jar/dilution ($10_0$-$10_{-2}$) for the test carriers were plated using TSA pour plates. Duplicate 1.0 mL aliquots from each jar/dilution ($10_{-1}$-$10_{-4}$) for the control carriers were plated using TSA pour plates.

Note: All dilutions and plating for each replicate carrier were performed within one hour of the transfer into the neutralizer. All test plates were incubated for 48±4 hours at 35-37° C., colonies were counted and CFU/carrier calculated. For *Enterobacter aerogenes*: Plates were incubated for 48±4 hours at 25-30° C., colonies were counted and CFU/carrier calculated.

A. Controls:
1. Culture Purity Control:
Each prepared culture was streaked for isolation using TSA (initial and final sanitizer inocula preparations as well as each Simulated Wear and Reinoculation inocula (two, one for each day of the two day regimen)). All plates were incubated with the test plates. The isolated cultures were observed for purity.

2. Organic Soil Sterility Control:
Duplicate 1.0 mL aliquots of the prepared organic soil were plated in TSA pour plates. This was performed on each of the following days of the assay: the initial and final sanitizer days as each of the two day Simulated Wear and Reinoculation procedures. The plates were incubated with the test plates and observed for growth or no growth.

3. Inoculum Confirmation Counts Control:
Each prepared inoculum was serially diluted using PBS and selected dilutions were plated in duplicate using TSA pour plates. This was performed on each of the following days of the assay: the initial and final sanitizer days and each of the two day Simulated Wear and Reinoculation procedures. All plates were incubated with the test plates.

4. Neutralizer Sterility Control:
A single jar containing the neutralizer was incubated for 48±4 hours at 35-37° C. The neutralizer was observed for growth or no growth.

5. Carrier Sterility Control:
An uninoculated test (per lot) and control carrier were subcultured into independent jars containing the neutralizer and incubated for 48±4 hours at 35-37° C. The neutralizer was observed for growth or no growth.

6. Carrier Viability Control:
For each challenge microorganism, a single inoculated control carrier was subcultured into a jar containing the neutralizer and incubated in the same with the test plates (this control were done for both the initial and final sanitizer test days). The neutralizer jars were observed for growth or no growth.

7. Neutralizer Effectiveness Control:
The neutralization efficacy was evaluated for each challenge microorganism concurrently with the testing. Using sterile forceps, sterile carriers (one replicate for each of the three test lots and one replicate of the control surface) were transferred into jars containing 30 mL of neutralizer. At time intervals after each surface addition, an aliquot of the bacterial suspension (to yield approximately 1,000 CFU) were added and the jars will be mixed. At 5±1 minutes, a 1.0 mL aliquot were removed from each jar and plated using TSA pour plates. These procedures were repeated using additional dilutions (to yield approximately 500 CFU and 250 CFU). All plates were incubated with the initial sanitizer test plates.

8. Antimicrobial Susceptibility Testing of MRSA:
The prepared MRSA culture was subcultured onto a TSA+ plate and the plate was incubated for approximately 24 hours at 35-37° C. Following incubation, a suspension was prepared by suspending growth from the TSA+ culture in SS to yield equivalent turbidity to a 0.5 McFarland Standard. This prepared suspension was streaked onto MHA plate in a cross-hatch pattern and a 1 µg Oxacillin disc was placed onto the center of the plate. The plate was inverted and incubated for ≥24 hours at 35-37° C. The same procedures were conducted concurrently using the control microorganism, *Staphylococcus aureus*, ATCC 25923 to confirm the validity of the assay. The interpretation of the zone of inhibitions (ZOI) was based on established National Committee for Clinical Laboratory Standards (NCCLS) performance standards. As currently published, (NCCLS standard M100-S21) ZOI breakpoints must be ≤10 mm (rounded to the nearest whole mm) confirms resistance, 11-12 mm is considered intermediate resistance, and ≥13 mm confirms susceptibility.

9. Microorganism Confirmation Procedures:

A randomly selected colony from the carrier quantitation control plates, and if applicable, a randomly selected colony from a test plate was confirmed by colony morphology and Gram stain according to extant SOPs. The same procedures were performed using the culture purity control plates and the result regarding purity was documented as well.

Example 6

Methods for Producing Copper Containing Composite Structural Solid Materials: Continuous Pour Process It was also of interest to establish whether other methodology could be used to arrive at the composite structures/ solid materials of this invention. Toward this end, a continuous auger based casting machine with integrated vacuum for a void free pour was built, which machine allowed for the mixing of the ingredients of the product.

The machine was built with a catalyst injection system, designed to enable catalyst introduction at the very last moment of mixture of the materials in the auger in order to lower the risk of premature oxidation due to the mixture of oxide and peroxide, which can accelerate catalysis and limit or prohibit proper material curing.

As the casting machine uses a central auger to mix all ingredients, it uses smaller augers to retrieve the ingredients from separate hoppers attached to the machine through the smaller augers. FIG. 5 provides a block diagram describing an embodied protocol for a continuous pour process of this invention. Step 1 of the embodied process depicts the blending of copper oxide (cuprous oxide and/or cupric oxide) and alumina trihydrate (CuO/ATH) to obtain a uniform mixture. Step 2 of the embodied process describes the use of small augers, which conduct the CuO/ATH, PET masterbatch and resin to a central Auger. According to this aspect, the PET masterbatch containing polymeric resin, cuprous oxide, cupric oxide or a combination thereof is prepared as described in PCT International Application publication number WO 2006/100665 (fully incorporated by reference herein) and pigments may be added to the same. The materials are blended and extruded at a high temperature to produce masterbatch pellets, whose copper oxide concentration is verified. Step 3 of the embodied process describes the blending of all the materials conveyed to the central Auger. Such mixture may in some embodiments, be conducted under a vacuum and/or under pressure. Step 4 of the embodied process describes the extrusion/pouring of the blended composition and molding/casting into appropriate solid forms. In some embodied aspects, such pouring may include hard surface casting, curing, for example, in a batch process, cutting, finishing and polishing the materials thus produced, etc. Quality control checks for the composition and color may be conducted, as well.

In some aspects, the embodied protocol may make use of three smaller augers that feed the larger central mix auger. One small auger for Alumina Trihydrate, one small auger for PET blended oxide master batch pellets with a size range 100 microns to 600 microns, and one small auger for cuprous oxide.

As a result of the fine micron size of the cuprous oxide and its self-bonding nature, when the cuprous oxide powder was placed in the auger system without regard for the mixing order of the added components, the powder did not evenly travel within the auger system and even when it did travel, it was unevenly brought up in the auger producing an uneven and non-homogenous mixture. In addition, color distribution problems were identified, as the oxide did not uniformly mix and instead aggregated with itself, resulting in clumpy areas of oxide and streaking in the finished product and uneven distribution of the active components of the technology. In summary, it was found the oxide would not evenly disperse and mix on its own and resulted in a defective product.

When cuprous oxide in a micron size of between 0.1 micron to 20 micron was blended with Alumina Trihydrate with a micron size of 12 to 20 microns, the resulting mixture was stabilized not only in terms of the delivery of the Cuprous Oxide through the augers, but the resulted product showed an even dispersion of the cuprous oxide material in the mold and in the final product. The Alumina Trihydrate (ATH)/Copper oxide (OXIDE) pre-blending method utilized tumble mixing, blade mixing or ribbon mixing for thirty to forty minutes. When less than thirty minutes of mixing was conducted, uniform blending did not occur.

The blended ATH/OXIDE allowed for ideal uniform distribution in terms of both the aesthetics (e.g. in terms of coloring) and the antimicrobial efficacy throughout the poured sheet. (This blended ratio can be anywhere from 20:1 ATH to OXIDE and upwards to 1:2 ATH to OXIDE).

Hence, a blending process was used to mix the copper oxide and ATH to produce a uniform and stable mixture wherein the copper oxide bonded to the ATH, which mixture then traveled through an auger from a smaller designated hopper into a central mixing auger within a continuous casting machine.

The small auger successfully moved the blended mixture up from the hopper filled with ATH/OXIDE to the main mixing hopper of the casting machine where it was combined with PET master batch as described hereinabove, polyester MMA with a range of 10%-50% by weight and catalyst with a range of 0.02-4% under vacuum. The mixture was then subjected to cast molding. The resulting product yielded a uniform composite sheet with a homogenous distribution of the active copper oxide component, which exhibited antimicrobial efficacy.

Figure 4A:
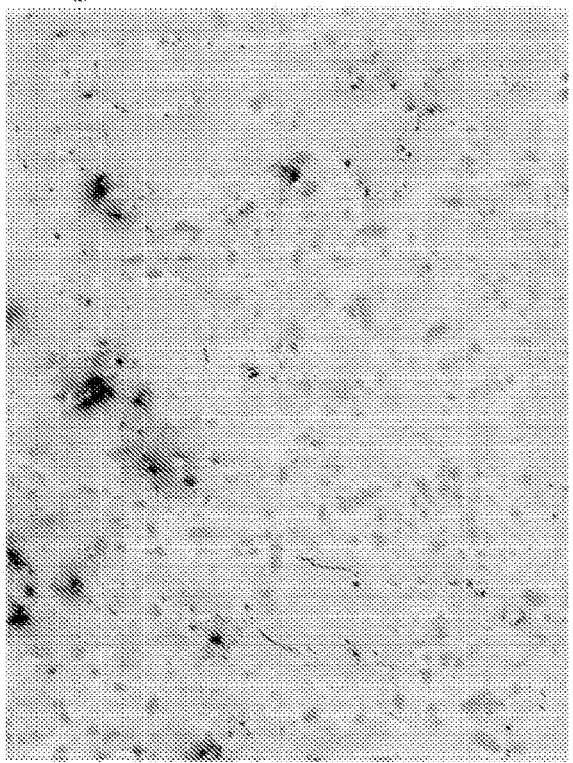
FIGS. 4A, 4B, 4C and 4D represent a series of scanning electron micrographs, which depict the substantially uniform distribution of copper particles throughout an embodied composite solid material of this invention.
Figure 4B:
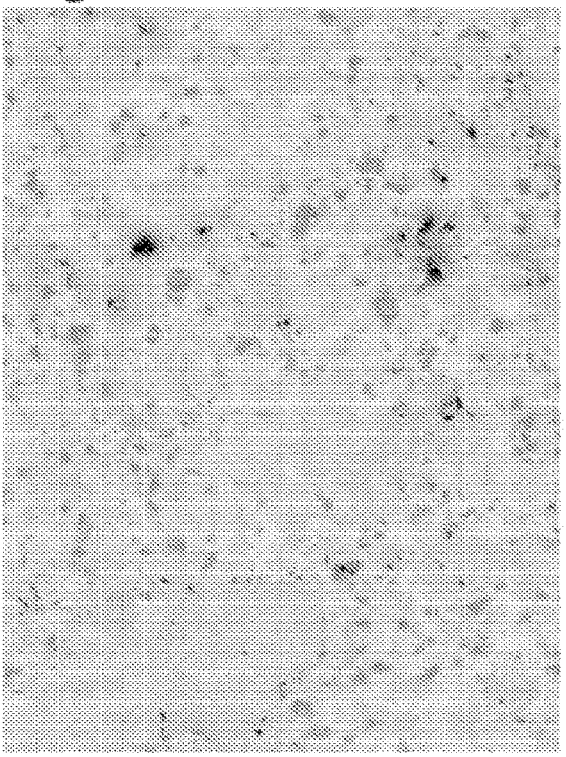
Figure 4C:
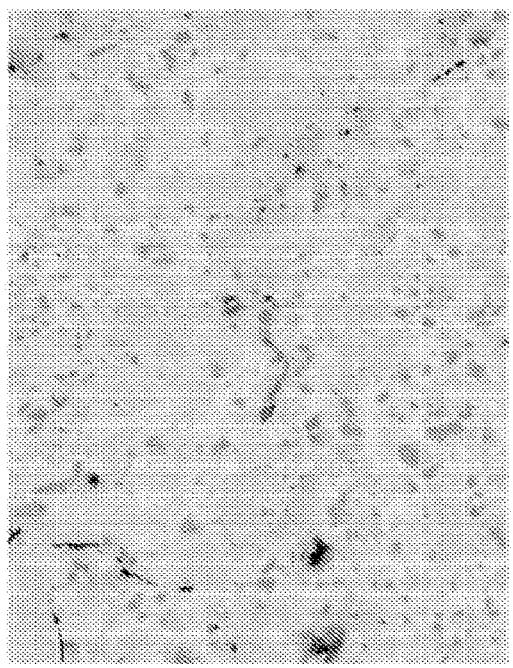
Figure 4D:
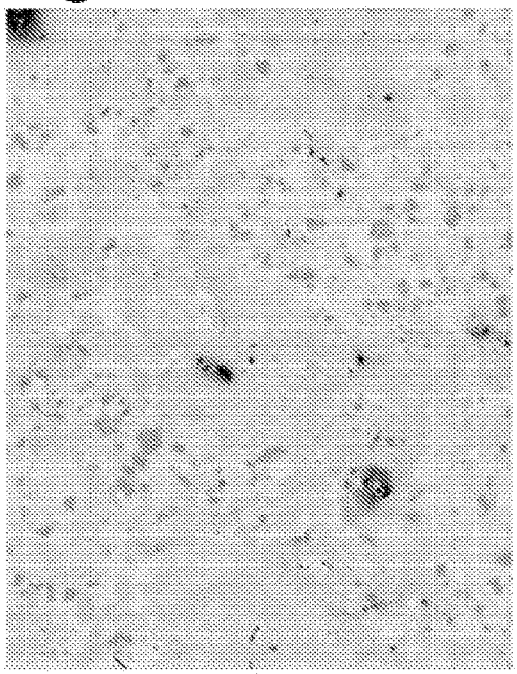

FIGS. 4A, 4B, 4C and 4D represent a series of scanning electron micrographs, which depict the substantially uniform distribution of copper particles throughout an embodied composite solid material of this invention. FIGS. 4A and 4B show representative images of a top surface of the embodied composite solid material of this invention and FIGS. 4C and 4D show representative images of a bottom surface of an embodied composite solid material of this invention.

EDS or energy dispersive spectroscopy, is a procedure coupled with scanning electron microscopy (SEM), in which the scattered electrons from the SEM are collected and assessed via detector, which facilitates determination of the composition of the sample assessed by SEM.

Figure 4E:
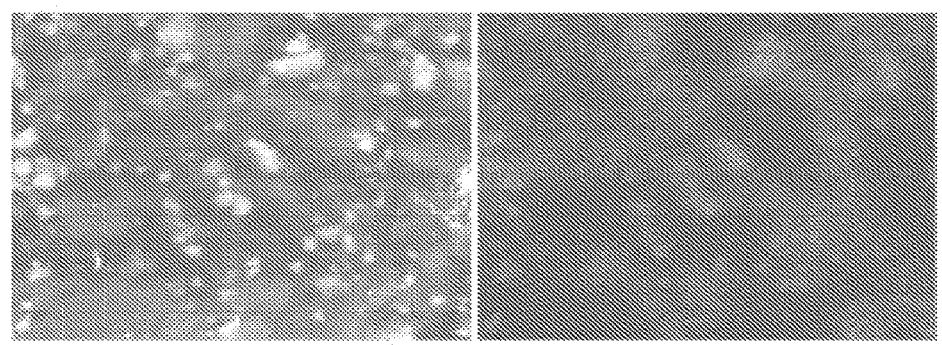
FIG. 4E provides EDS results, which confirms that the particles seen in the micrographs are copper particles.
Figure 4E:
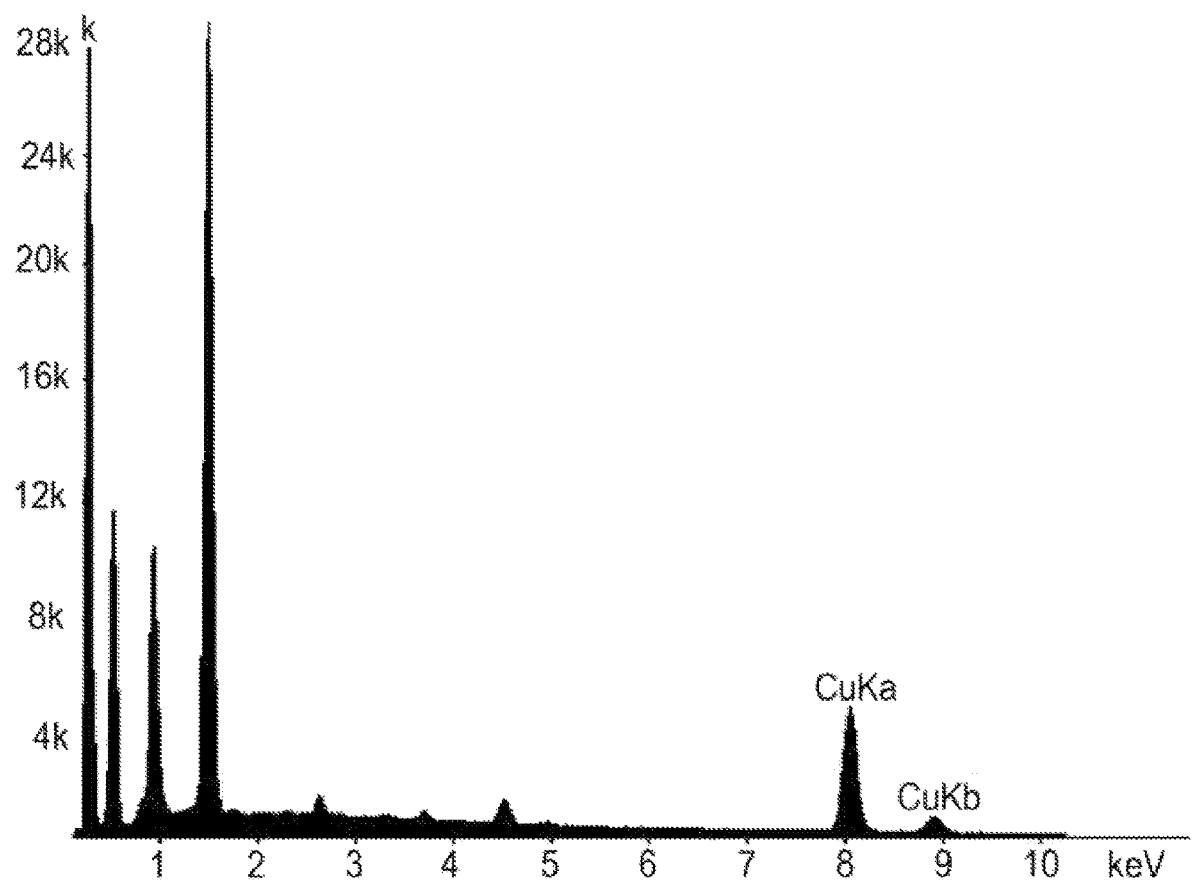

FIG. 4E provides EDS results], which confirms that the particles seen in the micrographs are copper particles, in samples prepared via the continuous pour process [.

Blending the cuprous oxide with a polyester paste in a ratio of from 100:1 to 4:1 (paste to oxide) facilitated cuprous oxide blending into a steady and uniform paste that could be pumped into the main auger of the continuous casting machine from a separate small mixer.

The invention claimed is:

1. A continuous pour process for the manufacture of a composite structural solid material comprising a thermoset resin and copper oxide particles substantially uniformly dispersed therein the process comprising the steps of:

mixing a filler with copper oxide until well blended to form a filler-copper oxide blend, wherein the filler-copper oxide blend oxide has a ratio of filler to copper oxide in the range of 20:1 to 1:2;

stepwise, subsequently mixing said filler-copper oxide blend with a thermoset resin, a copper oxide containing masterbatch, and optionally a pigment to form a copper oxide containing blended composition;

stepwise, subsequently mixing a catalyst with said copper oxide containing blended composition to form a polymerizable composite structural material;

distributing said polymerizable composite structural material in a mold; and providing conditions for polymerization of said polymerizable composite structural material, thereby preparing a composite structural solid material wherein the copper oxide is present at a concentration ranging from 15% to 50% w/w and wherein a portion of said copper oxide particles are surface exposed.

2. The process of claim 1, wherein said catalyst is methyl ethyl ketone.

3. The process of claim 1, wherein said thermoset resin comprises epoxy or polyester resins.

4. The process of claim 1, wherein said filler material makes up to between 10 and 30% by weight of the total composition.

5. The process of claim 1, wherein said copper oxide particles have a size ranging from about 5 to about 20 microns.

6. The process of claim 1, wherein said copper oxide particles have a size ranging from about 5 to about 10 microns.

7. The process of claim 1, further comprising the step of preparing a finished product incorporating said composite structural solid material.

8. The process of claim 1, further comprising the step of casting said polymeric resin mixture containing copper oxide powder and catalyst into a sheet.

9. The process of claim 1, further comprising the step of casting said polymeric resin mixture containing copper oxide powder and catalyst using a compression molding process.

10. The process of claim 1, further comprising the step of casting said polymeric resin mixture containing copper oxide powder and catalyst using an extrusion process.

11. The process of claim 1, further comprising the step of casting said polymeric resin mixture containing copper oxide powder and catalyst using an injection molding process.

* * * * *